US012216763B2

(12) United States Patent
Khan

(10) Patent No.: US 12,216,763 B2
(45) Date of Patent: Feb. 4, 2025

(54) DETECTING AND PROTECTING AGAINST INCONSISTENT USE OF CROSS-SITE REQUEST FORGERY MITIGATION FEATURES

(71) Applicant: MICROSOFT TECHNOLOGY LICENSING, LLC, Redmond, WA (US)

(72) Inventor: Safwan Mahmud Khan, Woodinville, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 569 days.

(21) Appl. No.: 17/512,563

(22) Filed: Oct. 27, 2021

(65) Prior Publication Data

US 2023/0129631 A1     Apr. 27, 2023

(51) Int. Cl.
*H04L 9/40*     (2022.01)
*G06F 8/75*     (2018.01)
(Continued)

(52) U.S. Cl.
CPC .............. *G06F 21/575* (2013.01); *G06F 8/75* (2013.01); *H04L 67/02* (2013.01); *G06F 2221/033* (2013.01); *G06F 2221/2119* (2013.01)

(58) Field of Classification Search
CPC .... G06F 21/575; G06F 8/75; G06F 2221/033; G06F 2221/2119; G06F 21/31; G06F 21/6263; H04L 67/02; H04L 63/1433
See application file for complete search history.

(56) References Cited

U.S. PATENT DOCUMENTS 10,652,266 B1 *   5/2020   Tautschnig .......... H04L 63/1441
11,537,400 B1 *  12/2022   Zhang ....................... G06F 8/51
(Continued)

OTHER PUBLICATIONS

Czeskis, et al., "Lightweight Server Support for Browser-Based CSRF Protection", In Proceedings of the 22nd International Conference on World Wide Web, May 13, 2013, 11 Pages.
(Continued)

*Primary Examiner* — Ali S Abyaneh
(74) *Attorney, Agent, or Firm* — David Foster; Newport IP, LLC

(57) ABSTRACT

The techniques disclosed herein detect Cross-Site Request Forgery (CSRF) vulnerabilities in a web application. In some configurations, CSRF vulnerabilities are detected by analyzing the source code of the web application. Specifically, CSRF vulnerabilities are detected by determining if CSRF mitigation features of one or more frameworks are being used incorrectly or inconsistently. Some CSRF mitigation features provided by web frameworks inject capabilities into the web application, e.g. to automatically store an anti-forgery token in a cookie, copy the anti-forgery token from the cookie into an HTML, form or a request header, or determine whether form submissions or request headers include the same anti-forgery token as the cookie. CSRF vulnerabilities may be detected by analyzing the source code to identify when one of these features is omitted or used incorrectly end-to-end. CSRF vulnerabilities are also detected by identifying when CSRF mitigation features of multiple web frameworks are incompatible.

20 Claims, 11 Drawing Sheets

(51) Int. Cl.
    *G06F 21/57*     (2013.01)
    *H04L 67/02*     (2022.01)

(56) References Cited

U.S. PATENT DOCUMENTS

| | | | | |
|---|---|---|---|---|
| 11,632,360 | B1* | 4/2023 | Tan | G06F 3/0622 |
| | | | | 726/4 |
| 2015/0347617 | A1* | 12/2015 | Weinig | G06F 16/986 |
| | | | | 715/234 |
| 2017/0127276 | A1* | 5/2017 | Koo | H04L 63/0807 |
| 2018/0054456 | A1* | 2/2018 | Ground | H04L 63/1433 |
| 2018/0121659 | A1* | 5/2018 | Sawhney | G06F 21/566 |
| 2021/0211469 | A1* | 7/2021 | Okunlola | H04L 63/102 |
| 2022/0027428 | A1* | 1/2022 | Sutton | G06F 21/563 |

OTHER PUBLICATIONS

Likaj, et al., "Where We Stand (or Fall): An Analysis of CSRF Defenses in Web Frameworks", In Proceedings of the 24th International Symposium on Research in Attacks, Intrusions and Defenses, Oct. 6, 2021, pp. 1-16.

"International Search Report and Written Opinion Issued in PCT Application No. PCT/US22/044653", Mailed Date: Jan. 10, 2023, 11 Pages.

Shahriar, et al., "Client-Side Detection of Cross-Site Request Forgery Attacks", In Proceedings of IEEE 21st International Symposium on Software Reliability Engineering, Nov. 1, 2010, 10 Pages.

"Azure Pipelines documentation", Retrieved from: https://web.archive.org/web/20210924183834/https://docs.microsoft.com/enus/azure/devops/pipelines/?view=azure-devops, Sep. 24, 2021, 7 Pages.

"Create and Render Partial Views", Retrieved from: https://web.archive.org/web/20210510074938/https://www.tutorialsteacher.com/mvc/partial-view-in-asp.net-mvc, May 10, 2021, 5 Pages.

"Cross-Site Request Forgery Prevention Cheat Sheet", Retrieved from: https://web.archive.org/web/20210817054259/https://cheatsheetseries.owasp.org/cheatsheets/Cross-Site_Request_Forgery_Prevention_Cheat_Sheet.html, Aug. 17, 2021, 15 Pages.

"OWASP Top 10", In Journal of OWASP Foundation, 2013, 22 Pages.

"What is Layout View in asp.net MVC", Retrieved from: https://web.archive.org/web/20210507035116/https://www.tutorialsteacher.com/mvc/layout-view-in-asp.net-mvc, May 7, 2021, 7 Pages.

Anderson, et al., "Prevent Cross-Site Request Forgery (XSRF/CSRF) attacks in asp.net Core", Retrieved from: https://docs.microsoft.com/en-us/aspnet/core/security/anti-request-forgery?view=aspnetcore-2.2, Dec. 5, 2019, 19 Pages.

Jenkins, et al., "Search", Retrieved from: https://docs.microsoft.com/en-us/rest/api/azure/devops/search/?view=azure-devops-rest-6.0, Sep. 26, 2019, 2 Pages.

O'Shannessy, et al., "React", Retrieved from: https://github.com/facebook/react, Mar. 22, 2021, 6 pages.

Schonning, et al., "Preventing Cross-Site Request Forgery (CSRF) Attacks in asp.net MVC Application", Retrieved from: https://docs.microsoft.com/en-us/aspnet/web-api/overview/security/preventing-cross-site-request-forgery-csrf-attacks, Dec. 12, 2021, 4 Pages.

\* cited by examiner

| AUTHENTICATION TOKEN 117 | ANTI-FORGERY TOKEN 204A |

AUTHENTICATION COOKIE 216

232 — `<form 239 action=https://www.banktwo.com/transfer method=POST target=invisibleframe>`
   `<input name=recipient value=attacker>`
   `<input name=amount value=$100>`
   `<input name=anti_forgery_token value=0x3dfe323f...`
`</form>`
`<script>document.forms[0].submit()</script>`

WEB RESPONSE 230

POST /transfer HTTP/1.1
referrer: http://www.attacker.com/blog
recipient=attacker&amount=$100&anti_forgery_token=0x3dfe323f...

FORM SUBMISSION 240

DETECTING AND PROTECTING AGAINST INCONSISTENT USE OF CROSS-SITE REQUEST FORGERY MITIGATION FEATURES

BACKGROUND

Cross-Site Request Forgery (CSRF) is a vulnerability that enables a hacker to submit a web request as if it had been submitted by an authenticated user. The exploit targets a user that has authenticated with a web application using a web browser. So long as the user remains authenticated, the web application will trust any request that originates from the same browser. If the authenticated user is tricked into submitting a malicious request, the web application will trust the malicious request as it would any other request sent by that user. This enables the hacker to perform any action the user is authorized to perform. A successful CSRF attack can result in damaged client relationships, unauthorized fund transfers, changed passwords, data theft, session cookie stealing etc.

For example, a hacker may target a user that has authenticated with an online banking web application. When the user authenticates (e.g. "logs-in"), the bank's web application sends a cookie with an authentication token to the user's browser. The browser stores the cookie and will provide the cookie with any subsequent web request sent to the web application until the cookie is erased.

At some point, the user is tricked into clicking on a link provided by the hacker. The user may come across the link in an email, on a social networking site, etc. The link may mimic the formatting and style of the bank, display text that seems authentic coming from a bank, and is directed to a website with an address that seems like an official bank website. For example, the link might display "Click here to open a BankTwo checking account and get a free toaster", while the link may direct the user to a website named "create-banktwo-checkingaccount.com". In other scenarios, instead of mimicking the bank's formatting and style, the link may target an apparently benign website created by the hacker, such as a news aggregator or a blog. Either way, once the link is clicked, the user's browser opens a new tab and navigates to a malicious web page created by the hacker.

The malicious web page contains a Hypertext Markup Language (HTML) form crafted by the hacker that, when submitted, sends a malicious HTTP request to the bank's web application. The hacker may craft the form to be compatible with the bank's web application—i.e. the attributes and child elements of the form have names and values expected by the bank's web application. In some scenarios, the form is submitted automatically in the background when the malicious web page is loaded. For example, the HTML form may include an action attribute and input elements that cause money to be transferred from the user's account to the hacker's account. When the form is submitted, the user's browser attaches the cookie containing the authentication token to the HTTP request, just as it would for any other HTTP request sent to the bank's website.

Upon receiving the form and the cookie, the bank's web application will use the authentication token to verify that the user is still logged in. If so, the bank's web application will perform the action specified by the malicious request. For example, the form may request that $100 be transferred from the user's checking account to the hacker's account.

There are many techniques used to mitigate CSRF attacks: requiring re-authentication for every potentially vulnerable operation, rejecting requests based on the referrer header, using the SameSite cookie attribute, etc. One of the most robust and well-established techniques is called "Double Submit Cookie".

When implementing "Double Submit Cookie", a server-side portion of the web application embeds a randomly generated anti-forgery token into the cookie that stores the authentication token. A client-side portion of the web application copies the anti-forgery token from the cookie into the body of an HTTP request or into a header of an HTTP request. For example, the client-side portion of the web application may copy the anti-forgery token into an HTML form included in the body of an HTTP request, or into a CSRF header of an HTTP request. Throughout this document, copying the anti-forgery token into an HTTP request refers to copying the anti-forgery token into the body of the HTTP request or copying the anti-forgery token into a header of the HTTP request. The server-side portion of the web application then determines if the request is valid by determining if the anti-forgery token embedded in the cookie matches the anti-forgery token embedded in the body of the HTTP request or a header of the HTTP request. Throughout this document, determining whether the anti-forgery token embedded in a cookie matches the anti-forgery token in an HTTP request refers to determining whether the anti-forgery token embedded in the cookie matches an anti-forgery token in the body of the HTTP request or an anti-forgery token in a header of the HTTP request.

The hacker is unable to obtain the anti-forgery token that the web application stored in the cookie, and so the hacker is unable to craft a form with a matching anti-forgery token. Specifically, because the hacker's website is from a different domain than the web application's, the hacker does not have access to the web application's cookie. Without the anti-forgery token, any HTML form crafted by the hacker will not satisfy the "Double Submit Cookie" security check.

As effective as this technique is in theory, it is very challenging to implement practically. In order to be effective, every HTML form submitted with an update action must include the anti-forgery token. Furthermore, every piece of code that processes form submissions must check if the anti-forgery token in the request is the same as the anti-forgery token in the cookie. To address this problem, server-side frameworks such as ASP.NET Core MVC and client-side web frameworks such as AngularJS include automatic support for generating and validating anti-forgery tokens. However, developers often mix and match frameworks, or use the features provided by these frameworks incorrectly or incompletely. As a result, CSRF vulnerabilities continue to be exploited.

It is with respect to these technical issues and others that the present disclosure is made.

SUMMARY

The techniques disclosed herein efficiently detect Cross-Site Request Forgery (CSRF) vulnerabilities in a web application and suggest steps to correct the vulnerabilities. In some configurations, CSRF vulnerabilities are detected by analyzing the source code of the web application. Specifically, CSRF vulnerabilities are detected by determining if CSRF mitigation features of one or more server-side frameworks and/or one or more client-side web frameworks are being used incorrectly or inconsistently. Throughout this document, "server-side framework" refers to a particular server-side library used by server-side code to generate web pages and respond to HTTP requests. "Client-side web framework" refers to a particular client-side library used by client-side code to render web content, respond to user interactions, and submit HTTP requests. "Framework" refers to either a server-side framework or a client-side web framework.

Some CSRF mitigation features provided by frameworks inject capabilities into the web application. A feature of a server-side framework may inject capabilities into a server-side portion of the web application to automatically store an anti-forgery token in a cookie. A feature of a client-side web framework may inject capabilities into a client-side portion of the web application to copy the anti-forgery token from the cookie into an HTTP request. For example, a feature of a client-side web framework may copy the anti-forgery token from the cookie into a hidden input element of an HTML, form. Another feature of a server-side framework injects capabilities into the server-side portion of the web application to determine whether an HTTP request includes the same anti-forgery token as the cookie. CSRF vulnerabilities may be detected by analyzing the source code of the web application to identify when one of these features is omitted or used incorrectly. CSRF vulnerabilities are also detected by identifying when CSRF mitigation features of multiple web frameworks are incompatible.

In some configurations, a CSRF analysis engine analyzes source code of a web application to identify CSRF vulnerabilities. By performing a static source code analysis, CSRF vulnerabilities may be detected as the web application is being developed. For example, a build pipeline that compiles the source code into a functioning web application may perform CSRF vulnerability analysis regularly, identifying potential issues early in the development cycle. CSRF vulnerabilities found earlier in the development cycle are often easier to fix and at a lower cost than a vulnerability found later in the development cycle. Importantly, if the vulnerability is found before the web application has been deployed to end users, it can be fixed before it is exploited by a hacker.

One distinguishing feature of the disclosed embodiments is that source code is analyzed to identify incorrect or missing usage of framework provided CSRF mitigation features. This is in contrast to techniques that identify CSRF vulnerabilities via a low-level control flow analysis of the source code. For example, instead of performing a control flow analysis of source code to determine whether the appropriate anti-forgery token is copied to a hidden field of an HTML form, the CSRF analysis engine analyzes source code to detect whether a client-side web framework feature is being used correctly to copy the anti-forgery token into the form. Focusing on whether framework CSRF mitigation features are being used correctly allows the analysis to be performed at a higher level of abstraction than control-flow analysis. This improves accuracy and efficiency, as well as reducing the number of false positives.

Before analyzing the source code of a web application, the CSRF analysis engine first identifies the frameworks used by the web application. A web application may use a single framework throughout, but it is also common for multiple frameworks to be employed. A framework may be identified by looking at file names, file extensions, folder names, or other filesystem metadata where the source code is stored. The text of the source code may also be analyzed for class and function names associated with various known frameworks.

A web application often contains source code that runs in a web browser in addition to source code that runs on a web server. Code that runs in a web browser is referred to herein as client-side code. Code that runs on a web server is referred to herein as server-side code. Client-side code and server-side code will often use different frameworks. Previous techniques for detecting CSRF vulnerabilities have focused on analyzing a single programming language at a time or only one side of the application at a time—e.g. only JavaScript code or only server-side code. In contrast, the disclosed embodiments perform an end-to-end analysis of the web application. Both client-side and server-side code is analyzed for the correct usage of different frameworks. The code being analyzed may be written in different programming languages. In this way, a comprehensive understanding of the usage of CSRF mitigation features can be obtained. End-to-end analysis may also enable determining whether different frameworks are used together in a compatible way.

Another benefit of the disclosed embodiments is that by analyzing both sides of the web application, and the interactions between them, fewer false positives are reported than when analyzing a single side in isolation. When only one side of the web application is analyzed, assumptions must be made about interactions with the other side. These assumptions may be overly conservative, leading to false positives. For example, a server-side only analysis must assume that a function is actually called by the client. Under this assumption, the server-side only analysis will flag the function as a CSRF vulnerability if it does not validate anti-forgery tokens. However, this assumption may be overly conservative—the client may never actually invoke the function. If the client never invokes the function then the function is secure against CSRF attacks for a different reason—it has no exposure to them—and so flagging the function as a CSRF vulnerability is reporting a false positive. By performing an end-to-end analysis of the web application, fewer assumptions have to be made, and so fewer false positives will be flagged on account of overly conservative assumptions.

One example of browser-server interaction is a user logging into a secure web application. The interaction begins with a web browser submitting a web request to a web server. The web request includes user credentials for authenticating the user. If the user is successfully authenticated, the server may provide a web page and an authentication cookie. The web page may include an HTML form which the browser may later submit with user-provided information. The web server may then perform some operation with the user-provided information.

A CSRF analysis engine may perform CSRF mitigation analysis at multiple points along an end-to-end flow. Continuing the example above, the CSRF analysis engine may identify all points in the server-side of a web application where an authentication request is received. The CSRF analysis engine may then determine whether a feature of a server-side framework is correctly used at each of these points to insert the anti-forgery token into a cookie. The analysis engine may also identify points in the client-side code that submit an HTTP request. The analysis engine may determine whether features of a client-side web framework are correctly used at each of these points to copy the anti-forgery token into the HTTP request—e.g. as part of an HTTP header or as a hidden input variable within an HTML, form. The analysis engine may also identify all points of server-based code where an HTTP request is received from a web browser. The analysis engine may then determine whether a server-side framework is correctly used at each of these points to validate that an anti-forgery token in the cookie matches an anti-forgery token in the HTTP request.

As discussed briefly above, a web application may employ more than one framework. The end-to-end analysis of a web application may also analyze whether multiple frameworks interact successfully to mitigate CSRF vulnerabilities. For example, if a feature of a framework is invoked by server-side code to store an anti-forgery token into a cookie, the CSRF analysis engine may determine if client-side code uses the same name to retrieve the anti-forgery token from the cookie. A similar analysis may be used at any point where different frameworks interact.

Application of the techniques described herein have significantly improved the true positive rate compared to previous techniques. In one test, the disclosed embodiment achieved a true positive rate of 85.4% with a 95% confidence. This is a significant improvement over the 20-30% true positive rates of some previous techniques. This improvement is accountable in part to the fact that false positives are reduced. Specifically, false positives are reduced because an end-to-end analysis reduces the number of conservative assumptions made about the behavior of other parts of the web application.

Features and technical benefits other than those explicitly described above will be apparent from a reading of the following Detailed Description and a review of the associated drawings. This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

FIG. 2B is a block diagram of data transmitted when applying the double submit cookie technique.

DETAILED DESCRIPTION

Figure 1A:
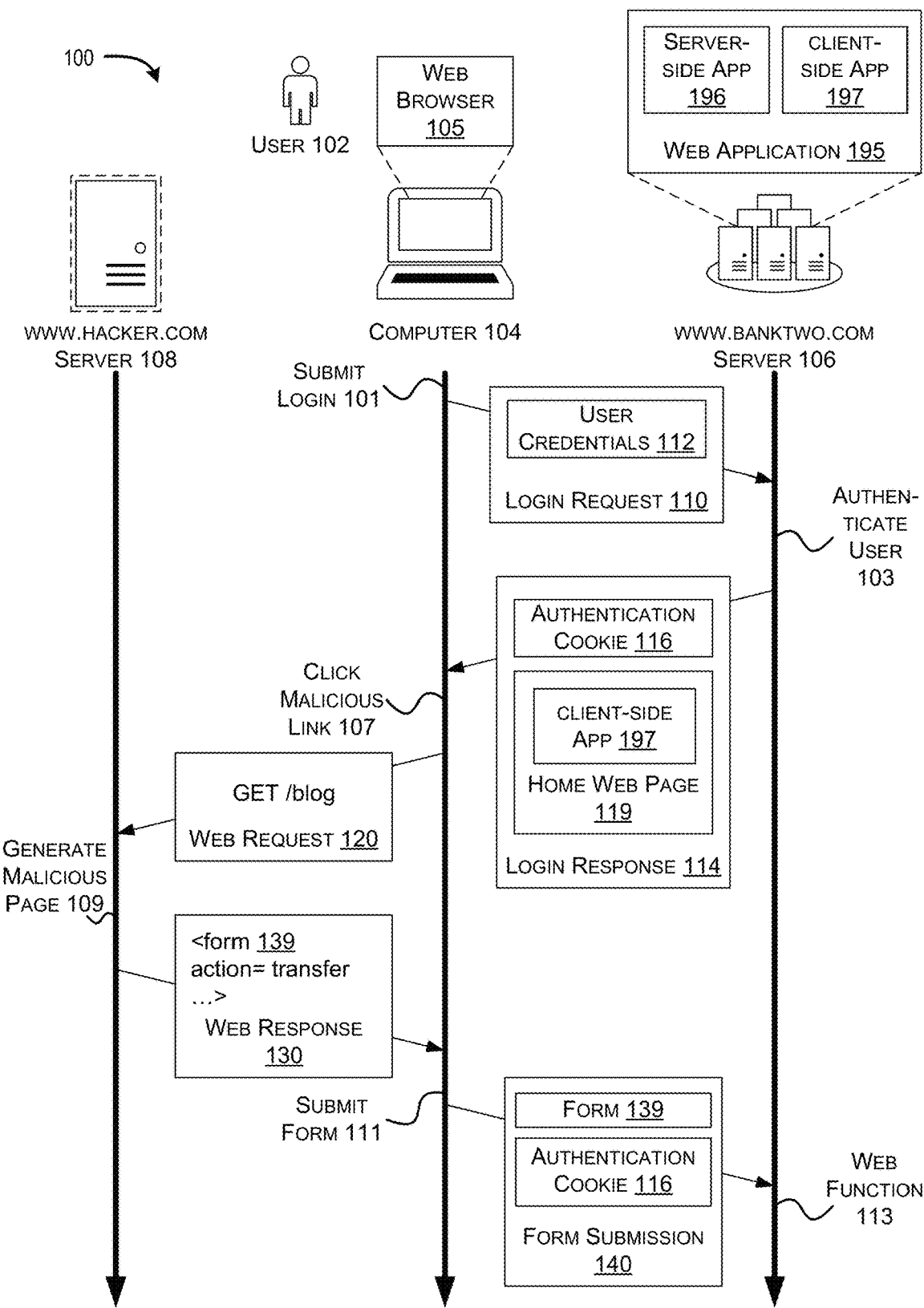
FIG. 1A is a timing diagram of a Cross-Site Request Forgery (CSRF) attack.

FIG. 1A is a timing diagram 100 of a Cross-Site Request Forgery (CSRF) attack. A CSRF attack is "cross-site" because an HTML form generated by a first website—a malicious website—is submitted to a second website—a target website. The attack is a "request forgery" because the form is crafted to mimic a genuine form of the target website. The form is also a forgery because it is submitted by a web browser that is trusted by the target website. Unable to determine that the form is a forgery, the target website processes the hacker-generated form as if it had been submitted by an authenticated user.

As illustrated, user 102 operates web browser 105 on computer 104. Computer 104 may be any computing device, including a laptop computer, desktop computer, mobile phone, tablet, wearable, automobile, or the like. Web browser 105 maybe any web browsing application such as Chrome®, Edge®, Firefox®, Etc. Web browser 105 utilizes hypertext transfer protocol (HTTP) among other network and Internet protocols to navigate to a web application 195 hosted by server computer 106. Web application 195 contains client-side application 197, e.g. HTML and script, that is downloaded by and executed within web browser 105. Web application 195 also contains server-side application 196 that executes on server 106. Browser-side application 197 may consist of static content such as HTML, images, and the like. Additionally or alternatively, client-side application 197 may be dynamically generated by server-side application 196. Browser-side application 197 may interact with server-side application 196 by submitting HTTP web requests and receiving HTTP web responses, although other communication techniques are similarly contemplated.

Web application 195 may be a secure web application, requiring a user to authenticate (e.g. "login") before allowing access to secured features. After navigating to a default page of web application 195, web browser 105 may perform a submit login action 101 to begin a login procedure. The submit login action 101 transmits login request 110 to web application 195. Login request 110 is a web request, such as an HTTP POST request, that contains user credentials 112. user credentials 112 may include a username and password supplied by user 102, biometric data, two factor authentication data, or any other secret of user 102.

In response to receiving login request 110, web application 195 may perform an authenticate user action 103 to verify the identity of user 102. For example, web application 195 may utilize a secure token server such as an Active Directory server to authenticate the user credentials 112 of user 102. The secure token server may provide an authentication token that securely identifies user 102 for a defined period of time. Authenticate user action 103 may also authorize web browser 105 to access to features of web application 195 on behalf of user 102.

Authenticate user action 103 may then respond to login request 110 by generating login response 114. Login response 114 may be an HTTP response that includes, among other things, an authentication cookie 116 and a home page 119. As referred to herein, a cookie stores data transmitted between client-side application 197 and server-side application 196. Cookies may store data in name-value pairs, such that a value is stored in or retrieved from a cookie by reference to a name. Authentication cookie 116 may store the authentication token that web application 195 obtained from user credentials 112. A policy of web browser 104 ensures that the data stored in authentication cookie 116 may only be accessed by a web page with the same domain name—e.g. a cookie received from banktwo.com may only be accessed by code that was also received from banktwo.com. In this way, other web applications running concurrently within web browser 105 are not able to access an authentication token in another domain's cookie.

Home web page 119 is an example of a web page—a combination of a document defined with a markup language such as HTML, scripts that interact with the document, styles that define the appearance of the document, and the like. The document may contain a form—an HTML element that contains input elements for soliciting data from user 102. As illustrated, home web page 119 also includes at least a portion of client-side application 197.

After having logged in successfully to web application 195, web browser 105 may store authentication cookie 116, making it available to client-side application 197 for a defined period of time. User 102 may then fall victim to a CSRF vulnerability by causing web browser 105 to perform a click malicious link action 107. A malicious link may be found in a social media application, email, message board, or the like. As discussed herein, the malicious link may be formatted and styled to look as if it came from web application 195. In response to the link being clicked, browser 105 opens a new tab and navigates to the target of the malicious link. As illustrated, clicking on the malicious link generates a web request 120, e.g. an HTTP GET request, and transmits it to server 108—i.e. a server controlled by a hacker. The URL of the link target may be crafted to appear to come from the institution that publishes web application 195, or the URL of the link target may be arbitrary.

Upon receiving web request 120, a web application hosted on server 108 may perform a generate malicious web page action 109. Generate malicious web page action 109 generates a web response 130 that includes a web page with HTML form 139. HTML form 139 is crafted to have the same elements, attributes, and other structure of a legitimate HTML form generated by web application 195. Form 139 may also target a legitimate URL of web application 195—a URL that is known to process HTML forms with the structure of form 139.

Once web response 130 is received by web browser 105, web browser 105 may perform a submit form action 111. Browser 105 may submit form 139 in response to a user interaction, such as a user clicking on a submit button of the web page contained in web response 130. If scripts are enabled by web browser 105, a script included in the web page contained in web response 130 may automatically submit form 139 when the page is loaded. Submit form action 111 generates form submission 140. Form submission 140 is an HTTP POST request that includes form 139. Form 139 may cause server-side application 196 to perform a malicious operation when it is processed by web function 113.

Form submission 140 targets the URL of web application 195, which has the same domain name as login response 114. Since the domain name of form submission 140 is the same as the domain name from which authentication cookie 116 was received, web browser 105 automatically attaches authentication cookie 116 to form submission 140. However, CSRF attacks leverage this feature of web browser 105 to submit hacker-generated form 139 as if it were generated by web application 195. Specifically, by automatically submitting authentication cookie 116 with any request that targets the same domain, authentication cookie 116 is attached to an HTTP request generated by a hacker. Since web application 195 trusts HTTP requests that include authentication cookie 116, the hacker-crafted HTTP request is capable of performing any operation user 102 is authorized to perform.

Upon receipt of form submission 140, server-side application 196 verifies that the authentication token stored in authentication cookie 116 has not expired. Server-side application 196 may also verify that user 102 has permission to perform any operation caused by the submission of form 139. If user 102 remains authenticated and the operation is authorized, server-side application 196 may perform the web function action 113—processing the hacker-crafted form 139 as if it was submitted by user 102. As discussed above, this may enable a hacker to steal passwords, transfer money, crash an application, or perform any other potentially harmful operation.

Figure 1B:
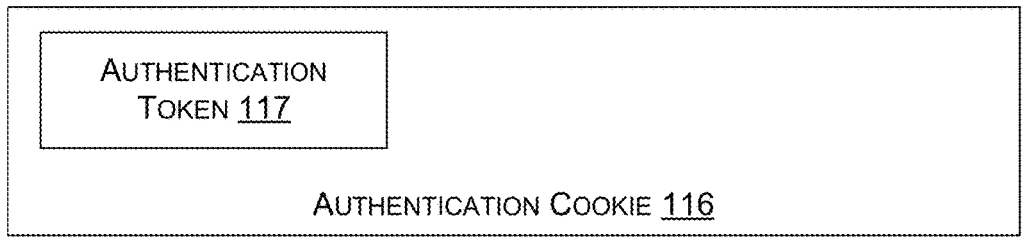
FIG. 1B is a block diagram of data transmitted during the CSRF attack.
Figure 1B:
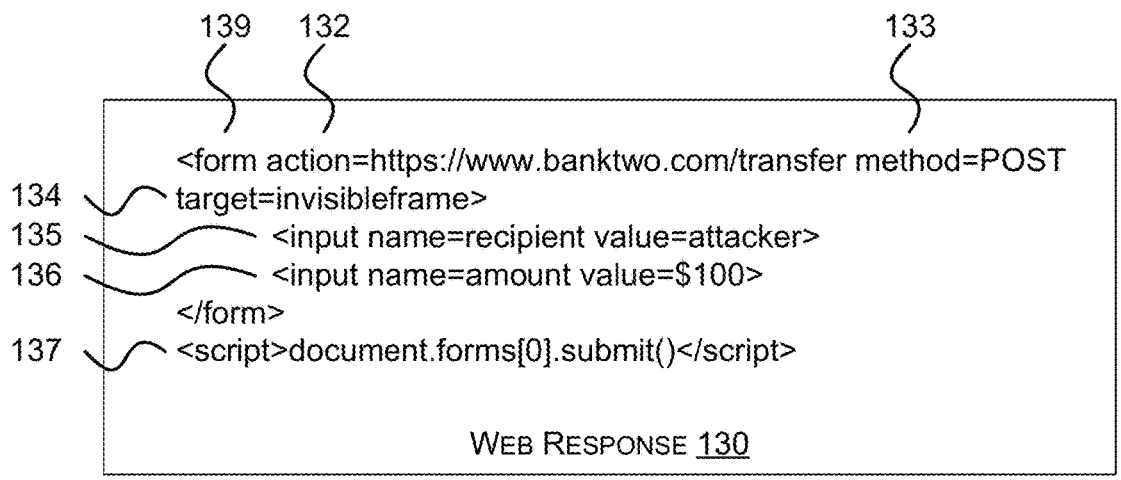
Figure 1B:
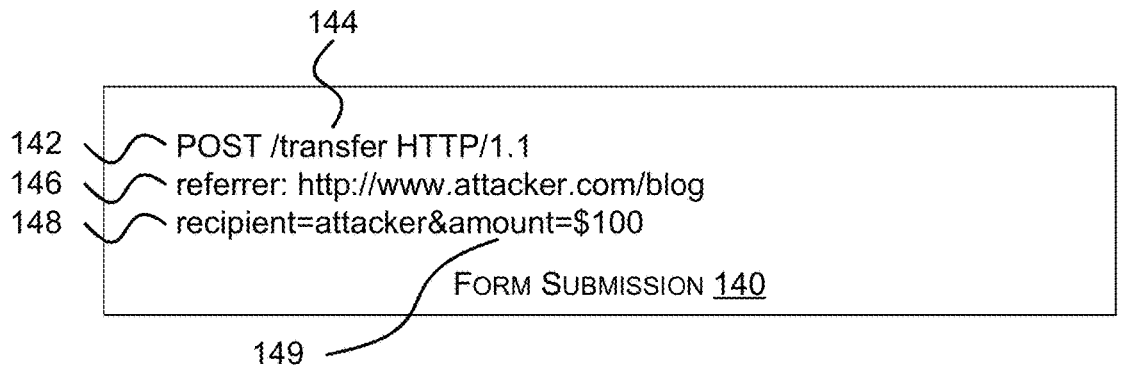

FIG. 1B is a block diagram of data transmitted during the CSRF attack. Authentication cookie 116 is illustrated as including authentication token 117. Authentication token 117 may have been obtained from a secure token server or other authentication authority based on user credentials 112. Authentication token 117 may be stored in a name-value pair data store of authentication cookie 116. For example, authentication token 117 may have the name "authentication-token", which is used by server-side web application 196 to store the authentication token and by client-side web application 197 to retrieve the authentication token.

Details of web response 130 are also illustrated. HTML, form 139 has action attribute 132, method attribute 133, and target attribute 134. The value of action attribute 132 is a URL to which form 139 will be submitted. As illustrated, the URL has a domain name of banktwo.com, the domain name of a fictional financial institution that user 102 has logged into. The URL also includes a function name to invoke on server-side web application 196. The function named "transfer" causes a bank transaction to be performed. The value of method attribute 133 is "POST", indicating that form 139 will be submitted via a web request that uses the HTTP POST method. The value of target attribute 134 is "invisible-frame", which is the name of a window or frame of web browser 105 where the web response to form submission 140 will be displayed. In order to hide the submission of form 139 from user 102 as long as possible, the response is displayed in an invisible frame.

Form 139 includes child elements 135 and 136. Element 135 is an input element with a name of recipient and a value of attacker. In the context of a CSRF attack that transfers money to a hacker's bank account, this input element 135 identifies the recipient of the transfer. Element 136 is another input element with name "amount" and value $100. In the context of a CSRF attack that transfers money to a hacker's bank account, this input element 136 indicates how much money to transfer. Form 139 maybe crafted to match the attributes and sub-elements that would appear in a form generated by web application 195, and which targets a domain name and function specified by action attribute 132. A hacker may craft form 139 in this way based on knowledge about HTML forms actually used by banktwo.com.

Web response 130 may also include a script element 137 that submits form 139. As illustrated, script 137 is global within an HTML document, and as such script 137 may be automatically executed when the document contained in web response 130 is rendered. In other embodiments, a user may manually submit form 139 by activating a form submit button.

Details of form submission 140 are also depicted. Form submission 140 includes an indication of the HTTP request method 142 being used. As illustrated, the HTTP request method 142 is POST, as input elements 135 and 136 are being "posted" to server-side web application 196. Form submission 140 also includes a target function 144—the "transfer" function. This is the server-side function that will be invoked when form submission 140 is received by server-side application 196. Referrer 146 illustrates that form 139 came from attacker.com—not banktwo.com. The names and values captured by input elements 135 and 136 are listed as parameters 148 and 149, respectively.

Figure 1C:
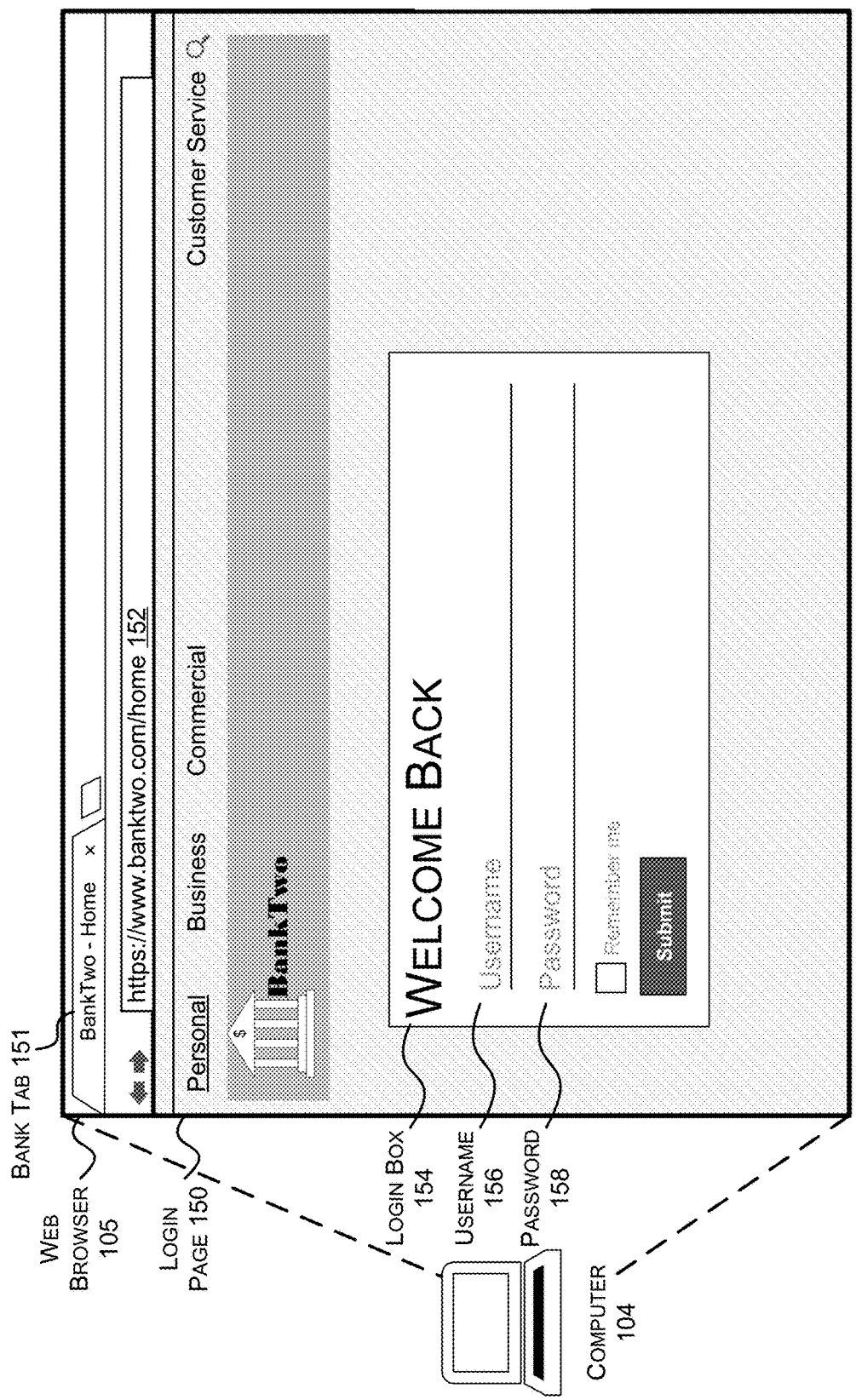
FIG. 1C illustrates a web browser logging into a bank web site.

FIG. 1C illustrates a web browser logging into a bank web site. This is part of a visualization of a user succumbing to a CSRF attack, continued in FIGS. 1D and 1E. FIG. 1C illustrates bank tab 151 of web browser 105 after user 102 has navigated to login page 150 of web application 195. User 102 may have caused web browser 105 to navigate to this page by manually typing in URL 152—"banktwo.com." Login page 150 is not specific to user 102, but includes login box 154 where username 156 and password 158 may be entered. Once these user credentials have been submitted and authenticated, web browser 105 will receive authentication cookie 116, storing it for future use by web requests to a banktwo.com domain name.

Figure 1D:
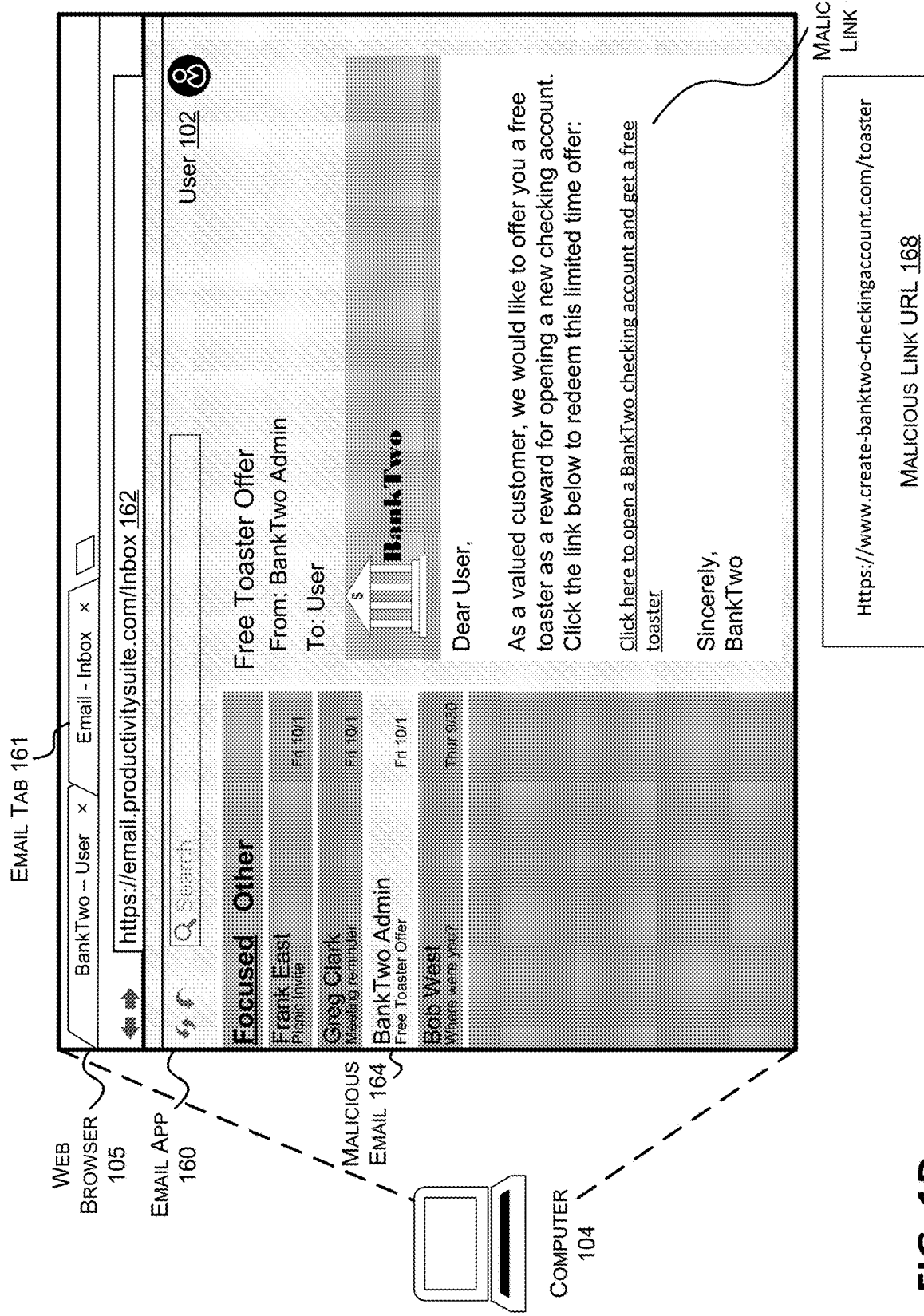
FIG. 1D illustrates a spam email masquerading as an email from the bank.

FIG. 1D illustrates a spam email masquerading as an email from BankTwo. As illustrated, user 102 remains logged in to the banktwo.com web application 195 in bank tab 151. Since email tab 161 is part of the same instance of web browser 105, web requests submitted by email tab 161 will automatically include any cookies associated with the target URL—even if the cookie was originally received on a different tab.

User 102 has navigated to an email application 160 at URL 162. Malicious email 164 has been selected, presenting user 102 with an email formatted and stylized as if it was an authentic banktwo.com email. Malicious email 164 includes malicious link 166, the text and style of which is designed to appear as if it came from BankTwo. Moreover, the malicious link URL 168 may appear to be associated with the BankTwo organization, while in reality it is operated by a hacker.

Figure 1E:
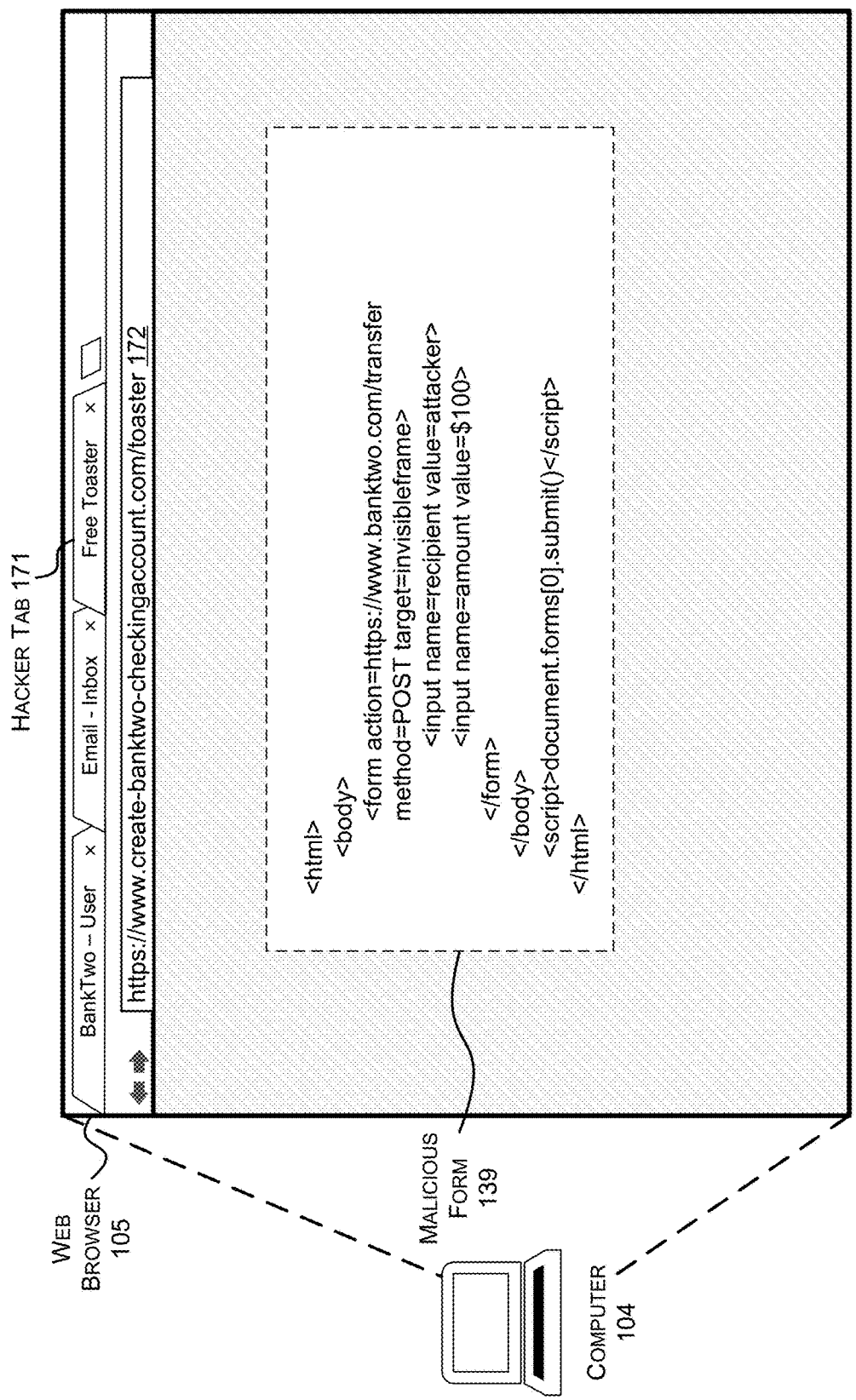
FIG. 1E illustrates a malicious HTML form that is submitted from the same web browser that is logged into the bank.

FIG. 1E illustrates a malicious HTML form 174 that is submitted from the same web browser that is logged into the bank. By clicking on malicious link 166, a new tab—hacker tab 171—is opened in web browser 105. Hacker tab 171 navigates to the hacker generated website 170 at URL 172. The hacker generated website 170 may be formatted and stylized to look like an authentic website of the target institution, BankTwo. As illustrated, hacker generated website 170 includes a basic HTML, page with form 139 and a script that automatically submits form 139 when website 170 is loaded. Form 139 will often be invisible to user 102, leaving them unaware that it was submitted on their behalf.

Figure 2A:
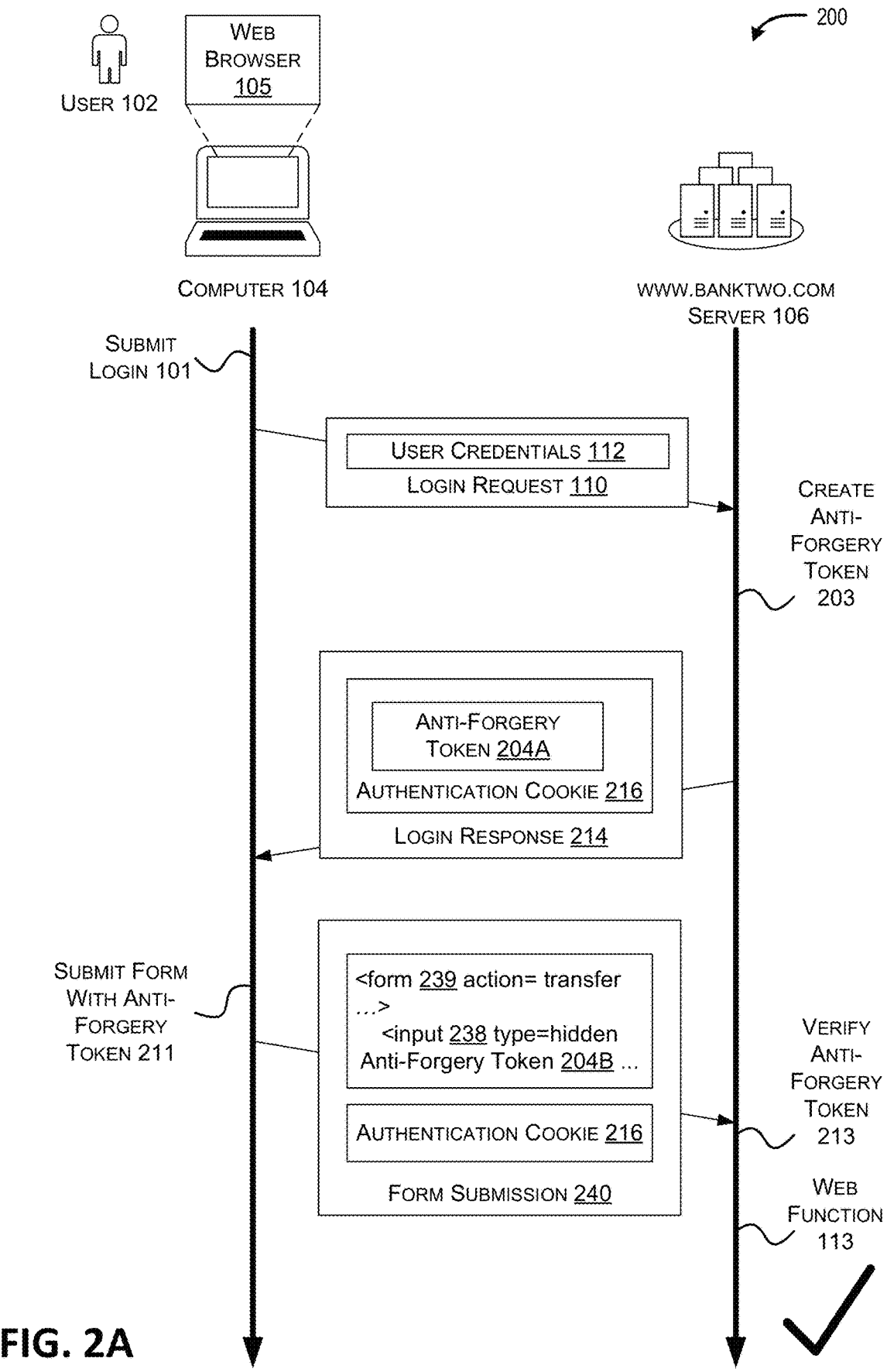
FIG. 2A is a timing diagram of a double submit cookie technique for defending against a CSRF attack.

FIG. 2A is a timing diagram of a double submit cookie technique for defending against a CSRF attack. Similar to FIG. 1, login request 110 containing user credentials 112 is received by server-side web application 196, and in response, server-side web application 196 obtains authentication token 117. When implementing a double-submit cookie technique, server-side web application 196 also performs the create anti-forgery token action 203, generating anti-forgery token 204. Anti-forgery token 204 may consist of any randomly generated number, string, or other symbol. Anti-forgery token 204 may be used to verify that an HTML form received by server-side web application 196 did in fact originate from web application 195.

Anti-forgery token 204A is a copy of anti-forgery token 204 that is added to authentication cookie 216. Authentication cookie 216 may be included in login response 214 sent by server-side web application 196 to browser-side web application 197. Browser-side web application 197 running in web browser 105 may receive login response 214, store authentication cookie 216, and render the web page contained in login response 214. By storing anti-forgery token 204A in authentication cookie 216, anti-forgery token 204 will be available to client-side web application 197 until it expires. Furthermore, every HTTP request submitted to a banktwo.com domain name will be submitted with authentication cookie 216. As such, anti-forgery token 204A will also be available to any function of server-side web application 196 that processes HTTP requests from client-side web application 197.

In some configurations, the web page contained in login response 214 contains form 239. In other configurations, form 239 is created dynamically by client-side web application 197. In either case, client-side web application 197 may copy anti-forgery token 204A to hidden input element 238 of form 239. This copy is illustrated as anti-forgery token 204B.

User 102 may then cause a "submit form with anti-forgery token action" 211. This action generates form submission 240 containing form 239 and authentication cookie 216. Upon receipt by server-side web application 196, a verify anti-forgery token 213 action may be taken that ensures form 239 originated from server-side web application 196—i.e. that form 239 did not originate from a hacker. Specifically, anti-forgery token 204B stored in input element 238 of form 239 is compared to anti-forgery token 204A stored in authentication cookie 216. If anti-forgery token 204A is the same as anti-forgery token 204B, then form 239 is verified as originating from server-side web application 196. In this case, function action 113 is allowed to proceed, processing form 239.

FIG. 2B is a block diagram of data transmitted when applying the double submit cookie technique. Authentication cookie 216, which corresponds to authentication cookie 116, is illustrated as including authentication token 117 and anti-forgery token 204A. Web response 230 includes form 239. Web response 230 includes input element 232, which stores anti-forgery token 204B. Form submission 240 includes a name value pair 249 for anti-forgery token 204 B.

Figure 3:
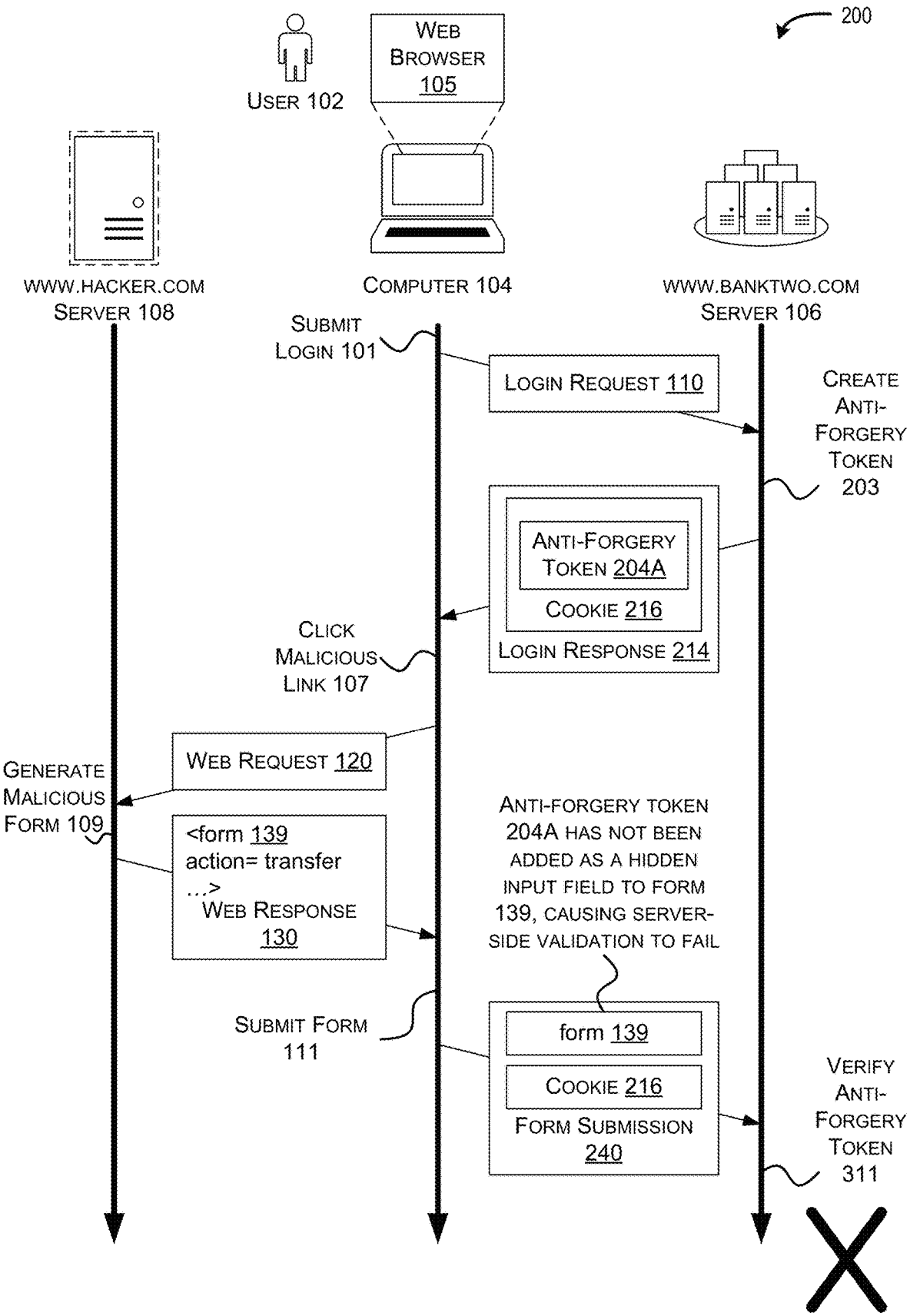
FIG. 3 is a timing diagram of a double submit cookie technique blocking a CSRF attack.

FIG. 3 is a timing diagram of a double submit cookie technique blocking a CSRF attack. As illustrated, web browser 105 interacts with web application 195 to create an anti-forgery token 204 while authenticating user 102. A web page contained in login response 214 is displayed by web browser 105. after successfully logging into web application 195, user 102 clicks on a malicious link, as illustrated in FIG. 1D. The malicious link opens a new tab 171 in web browser 105, and submits web request 120 to a hacker-controlled web site. Web response 130 generated by the hacker-controlled website includes HTML form 139. However, since the hacker-controlled website does not have access to cookie 216 it does not have access to anti-forgery token 204, and so it is impossible for form 139 to include an anti-forgery token that matches anti-forgery token 204A.

Figure 4:
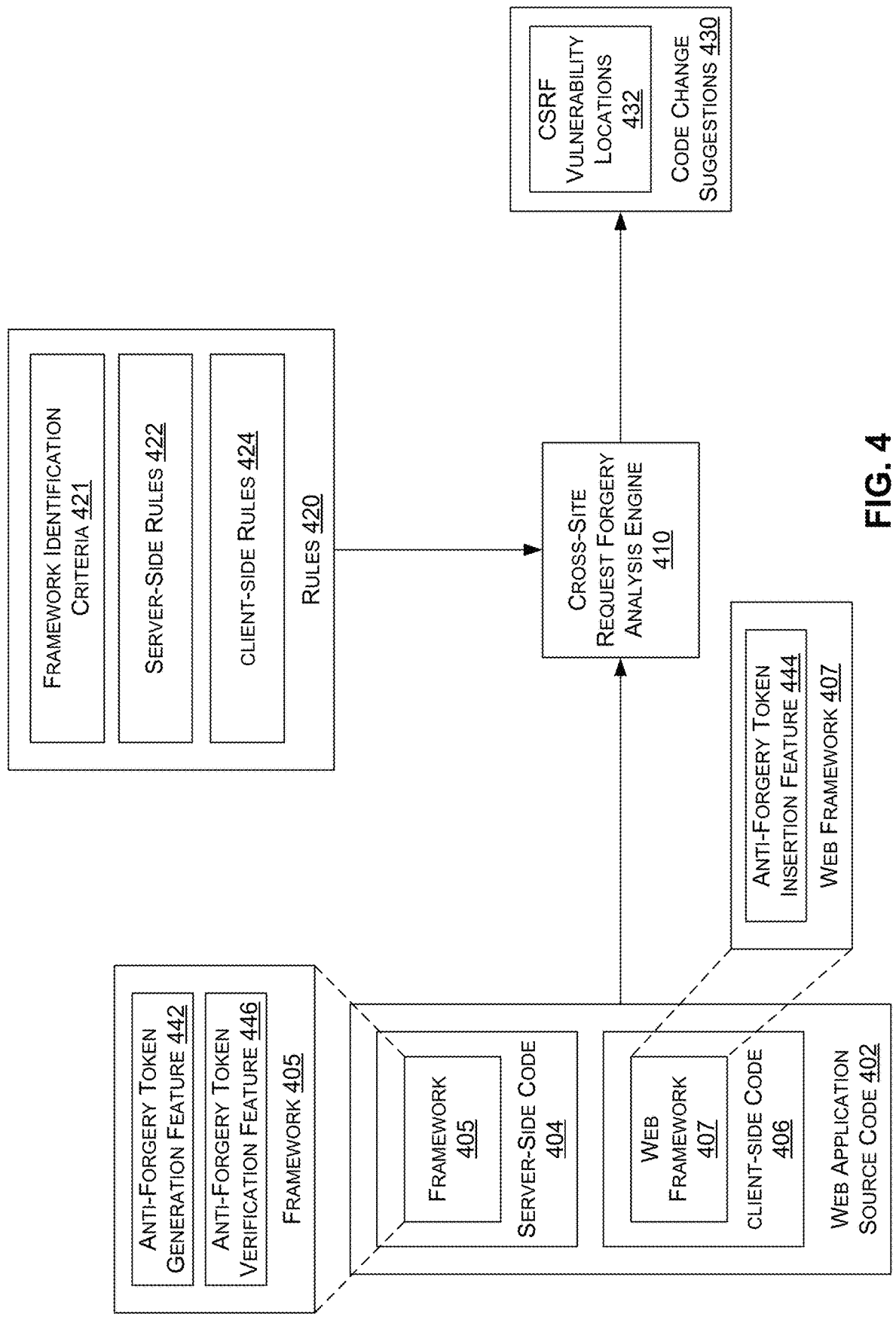
FIG. 4 is a block diagram of a code analysis technique that identifies CSRF vulnerabilities in a web application.

FIG. 4 is a block diagram of a code analysis technique that identifies CSRF vulnerabilities in a web application. Web application source code 402 is source code used to create web application 195. Web application source code 402 may utilize one or more frameworks to perform routine, mundane, and other common functionality associated with web applications. While it is possible to write custom code within web application source code 402 to mitigate CSRF vulnerabilities, this type of code is tedious and error prone. As such, frameworks are often utilized to mitigate against CSRF vulnerabilities. For example, a server-side framework may provide an attribute that may be added to a function that processes web requests. The attribute may cause an anti-forgery token in an HTML form to be compared to an anti-forgery token stored in a cookie, rejecting the web request if they do not match. However, consistently applying attributes is challenging. Also, not all frameworks are used across all aspects of a web application. A client-side web framework may not have the ability to add attributes or otherwise impact server-side functions, while a server-side framework may not be able to validate that client-side code submits anti-forgery tokens with web requests. Furthermore, web application source code 402 may use different frameworks, and it may be difficult to coordinate the CSRF mitigation features of each framework.

In some configurations, in order to determine if features of one or more frameworks are used consistently to mitigate CSRF vulnerabilities, web application source code 402 is provided to cross-site request forgery analysis engine 410 for analysis. CSRF analysis engine 410 may identify which frameworks are used by web application source code 402. CSRF analysis engine 410 may then apply rules, conditions, and exceptions associated with the identified frameworks to determine if features of the frameworks are being used consistently and correctly to mitigate CSRF vulnerabilities. CSRF analysis engine 410 may then produce a list of code change suggestions 430, which may include a list of CSRF vulnerability locations 432 within web application source code 402.

Web application source code 402 may be located in a local directory of a file system, stored in a source code repository, or the like. CSRF analysis engine 410 may receive web application source code 402 as a result of a query to an application program interface (API) of a source code repository. CSRF analysis engine 410 may be invoked by a software engineer, or by an automated build process. Time and expense are saved by identifying potential CSRF vulnerabilities earlier in the development process, while code quality of web application 195 is increased by reducing security vulnerabilities.

Web application source code 402 may include server-side code 404 that is associated with server-side web application 196. Web application source code 402 may also include client-side source code 406 that is associated with client-side web application 197. This categorization of server-side and client-side code is one example of a division of web application source code 402. However, other divisions of web application source code 402 are similarly contemplated, such as dividing web application source code 402 into components by vendor. As another example, web application source code 402 may be divided into components by feature. These other components may or may not include server-side and client-side code. The techniques described herein with respect to dividing web application source code 402 into client and server components apply equally to these other types of divisions.

As illustrated, server-side code 404 uses server-side framework 405. Framework 405 may include anti-forgery token generation feature 442 and anti-forgery token verification feature 446. These features may be applied to functions that respond to web requests, functions that generate web responses, and other locations within server-side source code 404 that create, transmit, or validate anti-forgery tokens. Similarly, client-side code 406 uses web framework 407, which includes anti-forgery token insertion feature 444. This feature may be applied to functions or other code that generates and/or submits a form.

For example, anti-forgery token generation feature 442 may be applied to an authentication function that receives user credentials in a web request, obtains an authentication token, and provides a web response with an authentication cookie that contains the authentication token. Anti-forgery token generation feature 442 may cause an anti-forgery token 204 to be generated and stored in the authentication cookie 216. However, anti-forgery token generation feature 442 may also be applied to any function that returns a web response with a cookie.

Anti-forgery token generation feature 442 is typically applied to a function within server-side code 404. However, web applications that perform some if not all operations in web-browser code may authenticate user 102 with a secure token server directly from web browser 105. In these situations, anti-forgery token generation feature 442 may be applied to a function that executes in web browser 105.

Anti-forgery token insertion feature 444 may be applied to client-side code. In scenarios where client-side code 406 dynamically generates HTML form 239, anti-forgery token insertion feature 444 may be applied to the client-side function that dynamically generates the form. In scenarios where form 239 already exists, anti-forgery token insertion feature 444 may be applied to client-side code 406 that submits the existing form 239. In either scenario, anti-forgery token insertion feature 444 causes anti-forgery token 204 to be copied from authentication cookie 216 into hidden input field 238 of form 239. Additionally or alternatively, anti-forgery token insertion feature 444 may copy anti-forgery token 204 from authentication cookie 216 to an HTTP header of form submission 240.

Anti-forgery token verification feature 446 is typically applied to a function within server-side code 404. When anti-forgery token 204B is included in the body of an HTTP request, such as in hidden input element 238 of form 239, anti-forgery token verification feature 446 may verify that form 239 includes the same anti-forgery token as in authentication cookie 216. When anti-forgery token 204B is included in a header of the HTTP request, anti-forgery token verification feature 446 may verify that the same anti-forgery token 204B in the HTTP header matches the anti-forgery token 204A in authentication cookie 216. In either case, if the anti-forgery tokens match, the web function 113 that processes form submission 240 is allowed to execute. If the anti-forgery tokens do not match, execution of the web function 113 will be blocked.

CSRF analysis engine 410 may apply rules 420 to identify potential CSRF vulnerabilities in web application source code 402. In some configurations, rules 420 include framework identification criteria 421, server-side rules 422, and client-side rules 424. Framework identification criteria 421 are used determine one or more frameworks used by a particular component of web application source code 402. For example, framework identification criteria 421 may be used to determine that the AngularJS client-side web framework is used by client-side code 406. Without an understanding of which framework is used by a particular component, project, or source code file, it is not clear which rules, if any, to apply.

Framework identification criteria 421 may include a list of filenames, directory names, or file extensions that are associated with the use of a particular framework. CSRF analysis engine 410 may identify one of the listed filenames, directory names, or file extensions among the files of web application source code 402. Additionally or alternatively, CSRF analysis engine 410 may open the files of web application source code 402 and search for the listed filenames, directory names, or file extensions. For example, CSRF analysis engine 410 may search the contents of a source code file for a filename of a library that is included, imported, or otherwise incorporated by reference. For example, a TypeScript source code file named app.module.ts may include the following import statement:

import{NgModule} from '@angular/core';

CSRF analysis engine 410 may determine that this file uses AngularJS because a module known to be associated with AngularJS—"NgModule" is being imported. CSRF analysis engine 410 may also determine that app.module.ts uses AngularJS because the imported module is located in a directory associated with AngularJS: "angular/core."

Framework identification criteria 421 may also include a list of functions, variable names, modules, or other identifiers that are associated with a particular web framework. For example, Microsoft ASP.NET Core MVC is both a client-side web framework and a server-side framework. Server-side code 404 may utilize functionality provided by ASP.NET Core MVC by implementing a class that inherits from an ASP.NET Core MVC base class. For instance, a class that inherits from "System.Web.MVC.Controller" may be identified as using the ASP.NET Core MVC framework.

In some configurations, once components of web application source code 402 are associated with one or more frameworks, CSRF analysis engine 410 may apply rules corresponding to the identified frameworks to identify instances where one or more of features 442-446 are applied incorrectly or inconsistently. For example, server-side rules 422 associated with an identified server-side framework and client-side rules 424 associated with an identified client-side web framework may be used to determine if features 442-446 are applied correctly and in all appropriate locations within source code 402.

Client-side rules 424 identify HTML elements or functions that satisfy a criterion, and then determine if the appropriate CSRF mitigation feature 444 is applied. For example, ASP.NET Core MVC provides client-side CSRF protection with the addition of an @Html.AntiForgeryToken attribute. The @Html.AntiForgeryToken attribute may be added inline to an HTML form. When applied, this attribute is converted to a hidden input element, and anti-forgery token 204 is copied into the hidden input element.

As such, CSRF analysis engine 410 may apply one of client-side rules 424 to search client-side code 406 for HTML forms that do not include an @Html.AntiForgeryToken attribute. The rule may further specify a file extension or other mechanism for limiting the search to a client-side file. For example, the rule may limit the search to source code files with a .cshtml extension, which is a file type associated with client-side views that contain a combination of literal HTML and HTML generated by the ASP.NET Core MVC Framework. The rule may also limit search results to forms that have a method attribute with the value "POST", since CSRF attacks may only apply to web requests with a POST method. However, other HTTP update methods are similarly contemplated, including PUT, DELETE, and PATCH HTTP methods. Any HTML forms that satisfy the criteria, and which do not include the @Html.AntiForgeryToken, may be identified as a CSRF vulnerability. The file name and line number of any such forms may be included in CSRF vulnerability locations 432. A suggestion of how to fix the vulnerability by applying the @Html.AntiForgeryToken attribute may be included in code change suggestions 430.

In some configurations, ASP.NET Core MVC provides client-side CSRF protection with the addition of a "tag helper." A tag-helper is executable code applied to an HTML element that performs common, mundane, and error-prone manipulations to the HTML element. In the case of an HTML form element, applying a tag helper will automatically cause a hidden input element to be added and anti-forgery token 204 to be stored therein. As such, one of client-side rules 424 associated with the ASP.NET Core MVC web framework excludes form elements with a "tag helper" from a list of vulnerabilities.

If client-side code 406—or a particular project within client-side code 406—is determined to use ASP.NET MVC (i.e. without the 'Core'), one of client-side rules 424 may search view files—e.g. files with a .cshtml extension—for an invocation of the "Html BeginForm" function. The "Html.BeginForm" function causes an HTML form to be created, and so the one of client-side rules 424 may identify "Html.BeginForm" functions that are not associated with an @Html.AntiForgeryToken as potential CSRF vulnerabilities.

Client-side rules 424 may also identify exceptions that override a determination of a CSRF vulnerability. For example, a determination that a <form> element or "Html.BeginForm" function is commented out will negate a determination that it poses a CSRF vulnerability.

In some configurations, an analysis of an HTML element or function call extends across multiple files. For example, an HTML element or a function call may inherit functionality from another file. For example, a file may be imported from within an HTML form. The imported file may be analyzed to determine if it includes any anti-forgery attributes that affect the HTML form. The imported file may be recursively analyzed to determine if they include an anti-forgery attribute that ultimately is applied to the HTML form. Examples of files that may be imported from within a form include layouts, master pages, and partial views. If the anti-forgery attribute is applied to the form element or "Html.BeginForm" function via inheritance from another file, the form/function is excluded from consideration as a CSRF vulnerability.

CSRF analysis engine 410 may also apply server-side rules 422. Server-side rules 422 identify functions that satisfy a criterion and then determine if the appropriate CSRF mitigation feature 442 and 446 are applied. For example, a function that is callable by a web browser and that processes an HTML form submission 240 may be identified as a CSRF vulnerability if an anti-forgery token verification feature 446 is not applied to it.

Server-side rules 422 look for CSRF mitigation features in different places and at different scopes within the application. For example, individual functions may be analyzed to determine if they meet one of the criteria set out in server-side rules 422, and whether a corresponding attribute is applied to those that do. However, a CSRF mitigation attribute may be applied to a class, mitigating CSRF attacks on all functions of the class. Similarly, a global configuration setting may apply CSRF mitigation techniques to any publicly accessible function. The application of server-side rules 422 may also identify functions that meet one of the criteria set out in server-side rules 422—e.g. processing an HTTP request submitted by a client—and then remove functions that are part of a class that has a corresponding CSRF mitigation attribute applied to it from consideration as CSRF vulnerabilities. Similarly, functions that meet one of the criteria laid out in server-side rules 422 but which have a global CSRF mitigation feature applied to them are excluded from consideration as a CSRF vulnerability.

Server-side rules 422 may also list one of a number of web framework features that are sufficient to mitigate a CSRF vulnerability for a function. For example, [ValidateAntiForgeryToken], [ValidateJsonAntiForgeryToken], [ValidateAntiForgeryHeader], etc. may all qualify as anti-forgery token verification features 446 for a particular framework. Other frameworks may have different sets of similarly named features.

In some configurations, non-standard framework features may also be identified as performing the desired CSRF mitigation function. These features may be identified based on a name that is substantially similar the name of the built-in CSRF mitigation features, such as "ValidateAntiForgeryTokenOnPostAttribute" or "SecurityInfoValidateJsonAntiForgeryTokenAttribute." These attributes may be identified based on an amount of a textual match to built-in CSRF mitigation features.

Server-side rules 422 may also be subject to exceptions, such as a determination that use of an anti-forgery token insertion feature 444 is applied to a form dynamically at build time. For example, a layout, master view, or a partial view may be dynamically included in a view during a build step. Identifying that functionality may be dynamically inserted into a form at build time may include recursively determining if the dynamically inserted functionality includes an anti-forgery token insertion feature 444. If this determination is made, the form is not added to the list of CSRF vulnerabilities 432.

Figure 5:
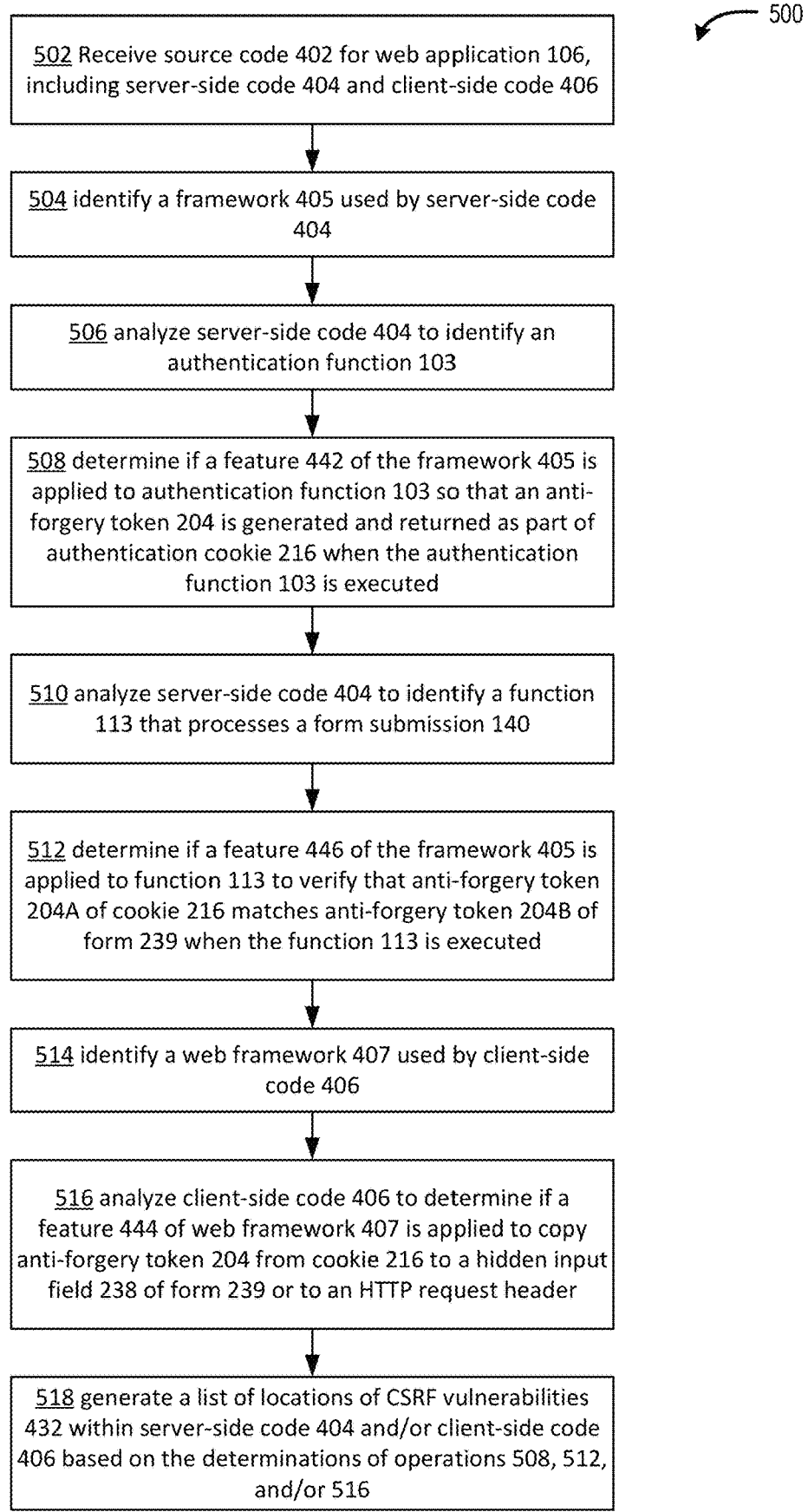
FIG. 5 is a flow diagram showing aspects of a routine for the disclosed techniques.

FIG. 5 is a flow diagram showing aspects of a routine for the disclosed techniques. Routine 500 begins at step 502, where source code 402 is received for web application 106, the source code 402 including server-side source code 404 and client-side source code 406.

Routine 500 then proceeds to step 504, where a web framework 405 used by server-side code 404 is identified based on framework identification criteria 421.

The routine then proceeds to step 506, where the server-side code 404 is analyzed to identify an authentication function 103.

The routine then proceeds to step 508, where a determination is made whether a feature 442 of the web framework 405 is correctly applied to authentication function 103 so that an anti-forgery token 204 is generated and returned as part of authentication cookie 216 when function 103 is executed.

The routine then proceeds to step 510, where server-side code 404 is analyzed to identify a function 113 that processes a form submission 140.

The routine then proceeds to step 512, where a determination is made if a feature 446 of the web framework 405 is applied to function 113 to verify that anti-forgery token 204A of cookie 216 matches anti-forgery token 204B of form 239 when function 113 is executed.

The routine then proceeds to step 514, where a web framework 407 used by client-side code 406 is identified.

The routine then proceeds to step 516, where client-side code 406 is analyzed to determine if a feature 444 of web framework 407 is applied to a function 113 that generates a web request 240 such that anti-forgery token 204A is included in cookie 216 and that anti-forgery token 204B is included in HTML, form 239 or a CSRF header of form submission 240.

The routine then proceeds to step 518, where a list of locations of CSRF vulnerabilities 432 are generated based on the determinations of operations 508, 512, and/or 516.

It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated methods can end at any time and need not be performed in its entirety. Some or all operations of the methods, and/or substantially equivalent operations, can be performed by execution of computer-readable instructions included on a computer-storage media and computer-readable media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

Although FIG. 5 refers to the components depicted in the present application, it can be appreciated that the operations of the routine 500 may be also implemented in many other ways. For example, the routine 500 may be implemented, at least in part, by a processor of another remote computer or a local circuit. In addition, one or more of the operations of the routine 500 may alternatively or additionally be implemented, at least in part, by a chipset working alone or in conjunction with other software modules.

Figure 6:
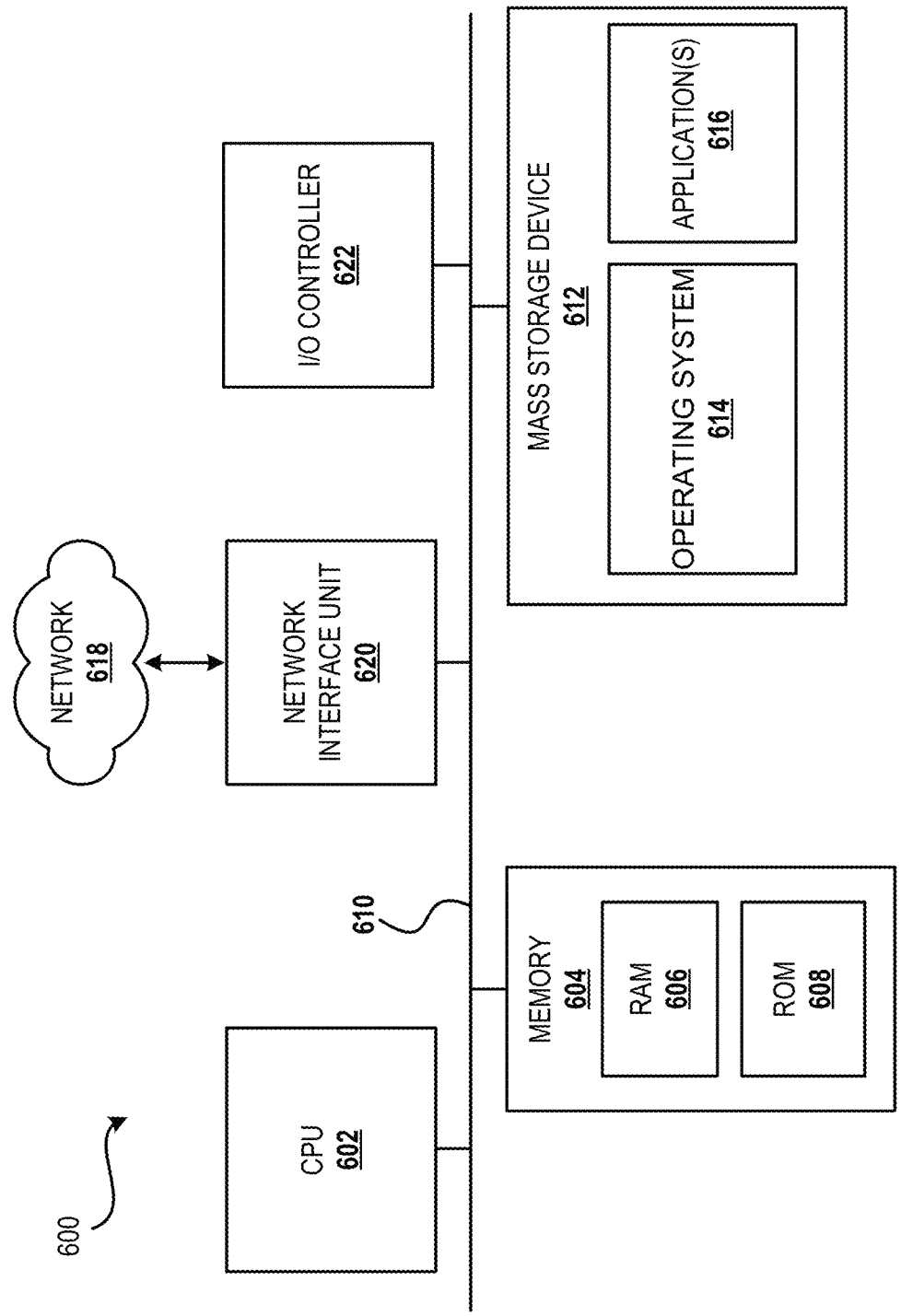
FIG. 6 is a computer architecture diagram illustrating an illustrative computer hardware and software architecture for a computing system capable of implementing aspects of the techniques and technologies presented herein.

FIG. 6 shows additional details of an example computer architecture 600 for a device, such as computer 104, server 106, or server 108, capable of executing computer instructions (e.g., a module or a program component described herein). The computer architecture 600 illustrated in FIG. 6 includes processing unit(s) 602, a system memory 604, including a random-access memory 606 ("RAM") and a read-only memory ("ROM") 608, and a system bus 610 that couples the memory 604 to the processing unit(s) 602.

Processing unit(s), such as processing unit(s) 602, can represent, for example, a CPU-type processing unit, a GPU-type processing unit, a field-programmable gate array (FPGA), another class of digital signal processor (DSP), or other hardware logic components that may, in some instances, be driven by a CPU. For example, and without limitation, illustrative types of hardware logic components that can be used include Application-Specific Integrated Circuits (ASICs), Application-Specific Standard Products (ASSPs), System-on-a-Chip Systems (SOCs), Complex Programmable Logic Devices (CPLDs), etc.

A basic input/output system containing the basic routines that help to transfer information between elements within the computer architecture 600, such as during startup, is stored in the ROM 608. The computer architecture 600 further includes a mass storage device 612 for storing an operating system 614, application(s) 616 (e.g., application 106, application backend 232), and other data described herein.

The mass storage device 612 is connected to processing unit(s) 602 through a mass storage controller connected to the bus 610. The mass storage device 612 and its associated computer-readable media provide non-volatile storage for the computer architecture 600. Although the description of computer-readable media contained herein refers to a mass storage device, it should be appreciated by those skilled in the art that computer-readable media can be any available computer-readable storage media or communication media that can be accessed by the computer architecture 600.

Computer-readable media can include computer-readable storage media and/or communication media. Computer-readable storage media can include one or more of volatile memory, nonvolatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including but not limited to random access memory (RAM), static random-access memory (SRAM), dynamic random-access memory (DRAM), phase change memory (PCM), read-only memory (ROM), erasable programmable read-only memory (EPROM), electrically erasable programmable read-only memory (EEPROM), flash memory, compact disc read-only memory (CD-ROM), digital versatile disks (DVDs), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to computer-readable storage media, communication media can embody computer-readable instructions, data structures, program modules, or other data in a modulated data signal, such as a carrier wave, or other transmission mechanism. As defined herein, computer storage media does not include communication media. That is, computer-readable storage media does not include communications media consisting solely of a modulated data signal, a carrier wave, or a propagated signal, per se.

According to various configurations, the computer architecture 600 may operate in a networked environment using logical connections to remote computers through the network 618. The computer architecture 600 may connect to the network 618 through a network interface unit 620 connected to the bus 610. The computer architecture 600 also may include an input/output controller 622 for receiving and processing input from a number of other devices, including a keyboard, mouse, touch, or electronic stylus or pen. Similarly, the input/output controller 622 may provide output to a display screen, speaker, or other type of output device.

It should be appreciated that the software components described herein may, when loaded into the processing unit(s) 602 and executed, transform the processing unit(s) 602 and the overall computer architecture 600 from a general-purpose computing system into a special-purpose computing system customized to facilitate the functionality presented herein. The processing unit(s) 602 may be constructed from any number of transistors or other discrete circuit elements, which may individually or collectively assume any number of states. More specifically, the processing unit(s) 602 may operate as a finite-state machine, in response to executable instructions contained within the software modules disclosed herein. These computer-executable instructions may transform the processing unit(s) 602 by specifying how the processing unit(s) 602 transition between states, thereby transforming the transistors or other discrete hardware elements constituting the processing unit(s) 602.

The present disclosure is supplemented by the following example clauses.

Clause 1: A method for detecting cross-site request forgery vulnerabilities, comprising: receiving a source code of a web application, the source code including a server-side source code and a client-side source code; identifying a framework used by the server-side source code and a web framework used by the client-side source code; and generating an indication of a cross-site request forgery vulnerability within the source code based on a determination that at least one of: a first feature of the framework is incorrectly applied to an authentication function within the server-side source code, wherein the first feature causes an anti-forgery token to be generated when the authentication function is executed, and wherein the first feature causes the anti-forgery token to be included in a cookie when the authentication function is executed, a second feature of the web framework is incorrectly applied to a web request generation function within the client-side source code, wherein the second feature ensures that a web request generated by the web request generation function includes a copy of the anti-forgery token, and a third feature of the framework is incorrectly applied to a server-side function that responds to the web request, wherein the third feature verifies that the anti-forgery token included in the cookie matches the copy of the anti-forgery token included in the web request.

Clause 2: The method of Clause 1, wherein the second feature copies the anti-forgery token from the cookie into a hidden input element of a web form that is included in the web request.

Clause 3: The method of Clause 1, wherein the second feature copies the anti-forgery token from the cookie into an HTTP header submitted with the web request.

Clause 4: The method of Clause 1, wherein the indication of the cross-site request forgery vulnerability is generated based on a determination that the second feature and the third feature do not use a same name when accessing the anti-forgery token in the web request.

Clause 5: The method of Clause 1, wherein the indication of the cross-site request forgery vulnerability is generated based on a determination that the first feature and the second feature do not use a same name when accessing the anti-forgery token in the cookie.

Clause 6: The method of Clause 1, wherein the authentication function is identified by searching the server-side source code for functions that receive user credentials and that return an authorization cookie comprising an authentication token.

Clause 7: The method of Clause 1, wherein the determination is made based on a static analysis of framework usage in the server-side source code and a static analysis of framework usage in the client-side source code.

Clause 8: The method of Clause 1, wherein the determination that the first feature is incorrectly applied to the authentication function includes identifying the authentication function within the server-side source code and determining that the first feature is not applied to the identified authentication function.

Clause 9: The method of Clause 1, wherein the first feature is applied to the authentication function by an attribute in the server-side source code proximate to the authentication function, and wherein determining that the first feature is incorrectly applied to the authentication function includes: searching the server-side source code for an individual function that receives an individual web request with a user credential and generates an individual web response that includes the cookie; and determining that the attribute is not proximate to the individual function.

Clause 10: A device comprising: one or more processors; and a computer-readable storage medium having encoded thereon computer-executable instructions that cause the one or more processors to: receive a source code for a web application, the source code including a server-side source code; identify a framework used by the server-side source code; and generate an indication of a cross-site request forgery vulnerability within the server-side source code based on a framework-based static analysis determination that at least one of: a first feature of the framework is not applied to an authentication function within the server-side source code, wherein the first feature causes an anti-forgery token to be generated when the authentication function is executed, and wherein the first feature causes the anti-forgery token to be included in a cookie when the authentication function is executed, and a second feature of the framework is not applied to a server-side function that responds to a web request, wherein the second feature verifies that the anti-forgery token included in the cookie matches the anti-forgery token included in the web request.

Clause 11: The device of Clause 10, wherein the authentication function receives a user credential, authenticates the user credential, generates an anti-forgery token, and includes the generated anti-forgery token in an individual web response.

Clause 12: The device of Clause 10, wherein generating an indication of a cross-site request forgery vulnerability within the server-side source code comprises generating a list of locations in the source code where a cross-site request forgery is found.

Clause 13: The device of Clause 10, wherein generating an indication of a cross-site request forgery vulnerability within the server-side source code comprises generating a list of suggested changes to the source code that mitigate the cross-site request forgery vulnerability.

Clause 14: The device of Clause 10, wherein the artifact token generation request is received from the cloud-hosted application, and wherein the framework is identified based on a file extension of a file in the source code, the existence of a framework-specific file name or directory structure within the source code, or the existence of a framework-specific identifier name within the source code.

Clause 15: A computer-readable storage medium storing instructions that, when executed by a processor, cause the processor to: receive a source code for a web application, the source code including a server-side source code and a client-side source code; identify a framework used by the server-side source code and a web framework used by the client-side source code; and generate an indication of a cross-site request forgery vulnerability within the server-side source code based on a determination that at least one of: a first feature of the framework is not applied to a authentication function within the server-side source code, wherein the first feature causes an anti-forgery token to be generated when the authentication function is executed, and wherein the first feature causes the anti-forgery token to be included in a cookie when the authentication function is executed, a second feature of the web framework is incorrectly applied within the client-side source code, wherein the second feature causes the anti-forgery token to be copied from the cookie to an HTML, form within the web response, and a third feature of the framework is not applied to a server-side function that responds to a web request, wherein the third feature verifies that the anti-forgery token included in the cookie matches the anti-forgery token included in the web request.

Clause 16: The computer-readable storage medium of Clause 15, wherein the determination that the first feature of the framework is not applied to the authentication function includes searching a plurality of files of the server-side source code for the authentication function and determining that the authentication function does not have an attribute associated with the first feature of the framework.

Clause 17: The computer-readable storage medium of Clause 16, wherein the determination that the first feature of the framework is not applied to the authentication function includes searching for a base class of a class that includes the authentication function and determining that the base class does not have an attribute associated with the first feature of the framework.

Clause 18: The computer-readable storage medium of Clause 16, wherein the determination that the first feature of the framework is not applied to the authentication function includes determining that a global configuration setting does not enable the first feature of the framework for the authentication function.

Clause 19: The computer-readable storage medium of Clause 15, wherein the indication of the cross-site request forgery vulnerability is generated based on a determination that the framework is incompatible with the web framework.

Clause 20: The computer-readable storage medium of Clause 15, wherein the determination that the second feature of the web framework is not applied includes searching a plurality of files for an HTML form element that does not include an individual anti-forgery token insertion attribute or a function that generates an HTML form element that is not proximate to an individual anti-forgery token insertion attribute.

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

The invention claimed is:

1. A method for detecting cross-site request forgery vulnerabilities, comprising:
   receiving a source code of a web application;
   opening the source code;
   identifying a framework by searching for an indication of the framework in the opened source code; and
   generating an indication of a cross-site request forgery vulnerability within the source code based on a determination that:
      a feature of the framework is incorrectly applied to an invocation of a function within the source code, wherein the feature causes an anti-forgery token to be generated when the function is executed, and wherein the feature causes the anti-forgery token to be included in a cookie when the function is executed.

2. The method of claim 1, wherein the source code comprises server-side source code, and wherein the function comprises an authentication function.

3. The method of claim 2, wherein the authentication function is identified by searching the opened server-side source code for functions that receive user credentials and that return an authorization cookie comprising an authentication token.

4. The method of claim 1, wherein the source code comprises client-side code, wherein the function comprises a web request generation function, wherein the feature ensures that a web request generated by the web request generation function includes a copy of an anti-forgery token, and wherein the determination that the feature of the framework is incorrectly applied comprises determining that the feature is not applied to the invocation of the web request generation function within the source code.

5. The method of claim 4, wherein the feature copies the anti-forgery token from a cookie into a hidden input element of a web form that is included in the web request.

6. The method of claim 1, wherein the source code comprises server-side source code, wherein the function comprises an authentication function, wherein the feature causes an anti-forgery token to be generated and included in a cookie when the authentication function is executed, wherein another feature verifies that the anti-forgery token is included in the cookie when a target function is executed, and wherein the determination that the feature of the framework is incorrectly applied comprises determining that the feature and the other feature use inconsistent names to reference the anti-forgery token in the cookie.

7. The method of claim 1, wherein the indication of the cross-site request forgery vulnerability is generated based on a determination that the feature and a second feature do not use a same name when accessing an anti-forgery token in a cookie.

8. The method of claim 1, wherein the determination is made based on a static analysis of the opened source code.

9. The method of claim 1, wherein the feature is applied to the invocation of the function by an attribute in the source code proximate to the invocation of the function, and wherein determining that the feature is incorrectly applied to the invocation of the function includes:
   searching the source code for an individual invocation of a function that receives an individual web request with a user credential and generates an individual web response that includes a cookie; and
   determining that the attribute is not proximate to the individual invocation of the function.

10. A device comprising:
    one or more processors; and
    a computer-readable storage medium having encoded thereon computer-executable instructions that cause the one or more processors to:
       receive, with the one or more processors, a source code for a web application;
       open the source code;
       scan the opened source code to identify a framework used by the source code; and
       generate an indication of a cross-site request forgery vulnerability within the opened source code based on a framework-based static analysis determination that:
          a feature of the framework is not applied to an authentication function within the source code, wherein the feature causes an anti-forgery token to be generated when the authentication function is executed, and wherein the feature causes the anti-forgery token to be included in a cookie when the authentication function is executed.

11. The device of claim 10, wherein the authentication function receives a user credential, authenticates the user credential, generates an anti-forgery token, and includes the generated anti-forgery token in an individual web response.

12. The device of claim 10, wherein generating an indication of a cross-site request forgery vulnerability within the source code comprises generating a list of locations in the source code where a cross-site request forgery vulnerability is found.

13. The device of claim 10, wherein generating an indication of a cross-site request forgery vulnerability within the source code comprises generating a list of suggested changes to the source code that mitigate the cross-site request forgery vulnerability.

14. The device of claim 10, wherein the framework is identified based on a file extension of a file in the source code, the existence of a framework-specific file name or directory structure within the source code, or the existence of a framework-specific identifier name within the source code.

15. A computer-readable storage media storing instructions that, when executed by a processor, cause the processor to:
    receive a source code for a web application, the source code including a server-side source code and a client-side source code;
    open the server-side source code;
    scan the opened server-side source code to identify a framework used by the server-side source code;
    open the client-side source code;
    scan the opened client-side source code to identify a web framework used by the client-side source code; and
    verify that the server-side source code and the client-side source code do not include a cross-site request forgery vulnerability based on a determination that:
       a first feature of the framework is applied to an authentication function within the server-side source code, wherein the first feature causes an anti-forgery token to be generated and included in a cookie when the authentication function is executed,
       a second feature of the web framework is correctly applied within the client-side source code, wherein the second feature causes the anti-forgery token to be copied from the cookie to an HTML form within a web response, and
       a third feature of the framework is applied to a server-side function that responds to a web request that includes the HTML form, wherein the third feature verifies that the anti-forgery token included in the cookie matches the anti-forgery token included in the HTML form included in the web request.

16. The computer-readable storage media of claim 15, wherein the determination that the first feature of the framework is applied to the authentication function includes searching a plurality of files of the opened server-side source code for the authentication function and determining that the authentication function has an attribute associated with the first feature of the framework.

17. The computer-readable storage media of claim 16, wherein the determination that the first feature of the framework is applied to the authentication function includes searching for a base class of a class that includes the authentication function and determining that the base class has an attribute associated with the first feature of the framework.

18. The computer-readable storage media of claim 16, wherein the determination that the first feature of the framework is applied to the authentication function includes determining that a global configuration setting enables the first feature of the framework for the authentication function.

19. The computer-readable storage media of claim 15, wherein the web application includes a cross-site request forgery vulnerability based on a determination that the framework is incompatible with the web framework.

20. The computer-readable storage media of claim 15, wherein the determination that the second feature of the web framework is correctly applied includes searching a plurality of files for an HTML form element that includes an individual anti-forgery token insertion attribute or a function that generates an HTML form element that is proximate to an individual anti-forgery token insertion attribute.

* * * * *